(12) United States Patent
Mauger et al.

(10) Patent No.: US 6,886,043 B1
(45) Date of Patent: Apr. 26, 2005

(54) COMMUNICATIONS NETWORK

(75) Inventors: Roy Mauger, Radlett (GB); David Stacey, Stansted Abbotts (GB); Mark Gibson, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 857 days.

(21) Appl. No.: 09/605,237

(22) Filed: Jun. 28, 2000

(51) Int. Cl.[7] .............................................. G06F 15/173
(52) U.S. Cl. ...................... 709/238; 709/245; 370/392
(58) Field of Search ................................ 709/237, 238, 709/239, 240, 241, 242, 245; 370/228, 351, 392, 400, 401, 352

(56) References Cited

U.S. PATENT DOCUMENTS

| | | | | |
|---|---|---|---|---|
| 6,205,488 B1 | * | 3/2001 | Casey et al. | 709/238 |
| 6,408,001 B1 | * | 6/2002 | Chuah et al. | 370/392 |
| 6,466,985 B1 | * | 10/2002 | Goyal et al. | 709/238 |
| 6,477,166 B1 | * | 11/2002 | Sanzi et al. | 370/395.1 |

OTHER PUBLICATIONS

XP–002115225—IETF Multiprotocol Label Switching (MPLS) Architecture—Francois Le Faucheur. IEEE International Conference on ATM (Jun. 22, 1998).
XP–000875017—Internet QoS: A Big Picture IEEE Network Mar./Apr. 1999.
XP–000752861—Evolution of Multiprotocol Label Switching—Viswanathan et al. IEEE Communications Magazine (May 1998).

* cited by examiner

Primary Examiner—Mehmet B. Geckil
(74) Attorney, Agent, or Firm—Barnes & Thornburg (57) ABSTRACT

In a label switch communications network, a third level of label is employed in conjunction with a dynamic multiplex constraint-based routed label switched path (CR-LSP) in order to achieve implicit switching at nodes within the network. Implicit switching occurs when a switching function takes place at a node without the need for any control function being required at that node. A three-layer label stack provided at the edge of the network achieves end-to-end connection oriented behaviour with guaranteed Quality of Service. The use of the three-layer label stack concentrates the control of the network to the two edges of the network and a single central switching stage of the network.

15 Claims, 10 Drawing Sheets

COMMUNICATIONS NETWORK

FIELD OF THE INVENTION

This invention relates to arrangements and methods for the switching or routing of traffic in a communication network.

BACKGROUND OF THE INVENTION

Traditionally, two types of legacy telecommunication networks have been developed. The first type of legacy network is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. Such packet traffic includes for example Internet protocol (IP) traffic. There is currently a drive towards unified networks which provide end to end transport for both voice and data services, and to this end the use of asynchronous transport has been introduced. This of course introduces the problem of supporting different protocols over a common network.

Asynchronous Transfer Mode (ATM) is the technology specified by the ITU-T as a broadband network technology suitable for all applications. For Internet protocol traffic however, ATM has proven to be less than fully effective at supporting Layer 3 routed applications, such as routed virtual private networks. This has led the IRTF (Internet Research Task Force) to specify multi-protocol label switching (MPLS) as a technology which inherits the desirable characteristics of ATM but is better matched to the Internet protocol. In particular MPLS provides a frame merge function in which data frames received from multiple sources are captured and sent out with a common label. This is key to support of Internet protocol Layer 3 Routed services. Service providers would ideally prefer a single network technology to support all of the services that they provide as this would achieve the lowest possible operational cost.

A particular problem with the introduction of a multi-service network is that of accommodating the various transport protocols and, in particular, that of providing end to end quality of service guarantees for high priority traffic such as voice. In particular, there is a need to provide a network that can carry both data and voice traffic at a local, national and international level while utilising a common transport protocol. A further problem with such a network is that of real time management of the virtual public/private networks that are established within the network. At present, each VPN manager requires a detailed knowledge of the network topology. In a large network this is a very significant operational task.

SUMMARY OF THE INVENTION

An object of the invention is to minimise or to overcome the above disadvantages.

According to a first aspect of the invention, there is provided a method of routing an information packet over a label switched path between first and second end stations in a virtual private network defined over a network arrangement comprising a hierarchical arrangement of first, second and third levels of routers, the method comprising attaching to the information packet at a network edge a sequence of first, second and third labels indicative of a corresponding concatenated sequence of label switched path sections within the virtual private network, each said path section extending between a pair of said routers.

According to another aspect of the invention, there is provided a communications multi-service network comprising: a plurality of nodes interconnected via quality of service capable tunnels and incorporating a frame-mode label switched (MPLS) architecture, wherein end-to-end communications having a predetermined quality of service are provided by defining at the network edge a label stack of first, second and third labels for delivering packets through a sequence of said tunnels defined by the label stack.

According to a further aspect of the invention, there is provided a communications multi-service network incorporating a plurality of dynamic multiplex constraint based label switched paths defining quality of service capable tunnels, each said path comprising a second layer constraint based label switched paths constrained within two first-layer constraint based label switched paths.

In our co-pending application Ser. No. 09/624,123 (11862ID Mauger) the use of a two-layer MPLS network in order to simplify the management of Virtual Public/Private Networks (VPN) is described. In this application, the use of a three-label stack provides connection oriented behaviour for voice traffic whilst retaining strict edge control analogous to standard IP network operation. The use of a three layer, five stage hierarchical network of routers enables the technique to be employed over an international or global network.

In a preferred embodiment, the invention provides a system in which a five-stage switching network is configured to allow scaling to the largest sizes required by any network operator for IP networking, Session Switched Multimedia, PSTN or any other service in a Multiservice network architecture.

In a preferred embodiment, the Common Open Policy Service (COPS) protocol is used to push MPLS Label Switched Paths (LSP) to establish a five-stage network and to establish end-to-end QoS capable connections.

In a further embodiment of the invention, there is provided a multi-service communications network incorporating at least one dynamic multiplex label switched path comprising a second layer constraint-based routed label switched path multiplexed into two first-layer constraint-based routed label switched paths.

The resource availability of the second-stage layer 1 CR-LSPs may be advertised periodically to the first-stage LSRs such that the resource availability may be utilised in DM-LSP path selection.

Advantageously, the individual dynamic multiplex label switched paths (DM-LSPs) have no pre-defined traffic contracts but instead are constrained by the traffic contracts of the first layer constraint-based routed label switched paths (CR-LSPs) in which they are contained.

In a preferred embodiment of the invention, we employ a three-layer label stack at the edge of the network in order to achieve end-to-end connection oriented behaviour with guaranteed quality of service. We have found that the use of the three-layer label stack is sufficient to minimise the control of the network to the two edges of the network and a single central switching stage of the network. In this manner the real-time control constraints placed on the second and fourth stages of the network are removed thus enabling these stages to scale to extremely large capacity.

Advantageously, a virtual private/public network is defined with multiple stages of constraint-based routed label switched paths.

MPLS has been defined by the IETF so as to be independent of the underlying transport mechanism. Mappings on to ATM have been defined as well as frame-mode networks using HDLC (High-level data link control) based or other forms of frame transport.

MPLS includes the concept of stacked labels; this allows a network to operate at multiple layers. For instance a first label in the stack can relate to a traffic trunk. A switch which only swapped this first label would handle the traffic trunk transparently. A switch which popped the first label, swapped the second label and pushed a new first label would be switching a service instance between two traffic trunks.

In our arrangement and method, a third level of label is employed in conjunction with a dynamic multiplex constraint-based routed label switched path (CR-LSP) in order to achieve implicit switching at certain nodes within a network. Implicit switching occurs when a switching function takes place at a node without the need for any control function being required at that node. Such an implicit switching function provides the advantages of simplifying the overall control architecture of the network and minimising the real-time processing requirements on those nodes that perform the implicit switching function. This enables very large scale nodes to be implemented while maintaining the flexibility of having switching points at those nodes.

Advantageously, a bandwidth allocation mechanism is used to pre-allocate, on a predictive or as needed basis, capacity within the second-stage Layer 1 constraint-based routed label switched paths such that dynamic multiplexed label switched path selection is deterministic.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the accompanying drawings in which.

DESCRIPTION OF PREFERRED EMBODIMENTS

Figure 1:
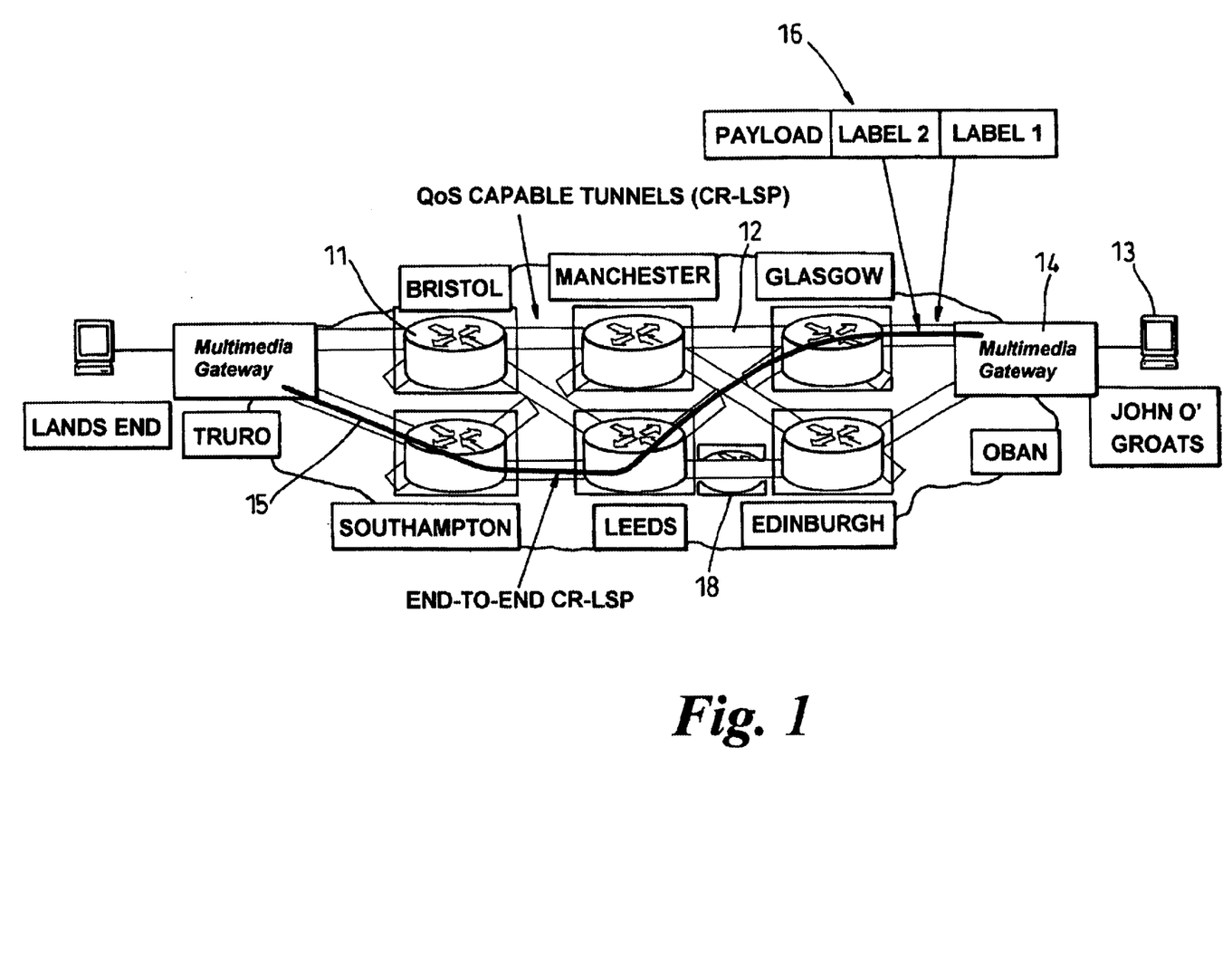
FIG. 1 is a schematic diagram of an exemplary virtual public/private network according to a preferred embodiment of the invention.

Referring first to FIG. 1, which is introduced for explanatory and comparative purposes, this figure illustrates in highly schematic form an exemplary virtual public/private network (VPN) deployed nationally or regionally in order to provide session switched multimedia services on a territorial basis. The network comprises a number of service nodes 11, located at the main centres of population, inter-linked via a network of core nodes by quality-of-service (QoS) capable tunnels 12. The construction of the core network will be described below. In FIG. 1, only one core node 18 is shown in the interests of clarity, but it will of course be appreciated that the network will incorporate a plurality of core nodes. Access to the network from user terminals 13 is provided via media gateways 14 each serving to one or more service nodes 11. Traffic is transported on constraint-based routed label switched paths (CR-LSP) 15 established between respective gateways. The network carries packet traffic, each packet 18 comprising a payload and first and second labels (Label1, Label2) indicative of the path over which the packet is to be routed.

CR-LSPs (constraint-based routed label switched paths) are deployed between the service nodes 11 of the network. Services such as inter-active voice, requiring strict QoS guarantees are supported by end-to-end CR-LSPs 15 as illustrated in FIG. 1. To take a simple example of QoS support, if all of the CR-LSPs at both traffic-trunk level and end-to-end are constant bit rate, then the performance of the end-to-end CR-LSP can be substantially equivalent to ATM-AAL1 (Asynchronous Transfer Mode Adaptation Layer One) assuming a typical 48-byte packetisation.

The IETF has defined two protocols for the establishment of CR-LSPs. These protocols are RSVP-Traffic Engineering, and Constraint-routed Label Distribution Protocol. CR-LSPs (constraint-based routed label switched paths) are point-to-point paths between designated network nodes. Such paths are each assigned a traffic contract which, in suitable carrier strength implementation, will be policed for conformance. We prefer to employ the CR-LDP protocol, but it will be appreciated by those skilled in the art that the RSVP-TE protocol has equivalent functionality and can be used to serve the same purpose. Such a CR-LSP has an LSPID (label switched path identifier) which can be used to specify a hop in a CR-LDP request. In such a case the new CR-LSP will be multiplexed into the specified CR-LSP and allocated a second level label. It is therefore possible to specify within the network of FIG. 1 a virtual public/private network (VPN) with multiple stages of first level CR-LSPs and to provide end-to-end services having a CR-LSP traffic contract by multiplexing further CR-LSPs into a set of appropriate first level CR-LSPs.

A feature of the constraint based routed label distribution protocol (CR-LDP) employed in the network of FIG. 1 is the use of an "abstract node" to define routing constraints. An abstract node consists of a sub-network of real nodes (core nodes) over which the constraint based routed label distribution protocol is allowed to select any available path to achieve a requested connection. Thus in a path specified as (real node A—abstract node B—abstract node C—real-node D) there may be multiple real nodes in each of the abstract nodes, and there may also be multiple trunks between the abstract nodes. This concept of abstract nodes simplifies the management of a VPN as the network manager only requires a view of the network at the abstract node level and does not require detailed view of the construction or internal operation of an abstract node.

Figure 2:
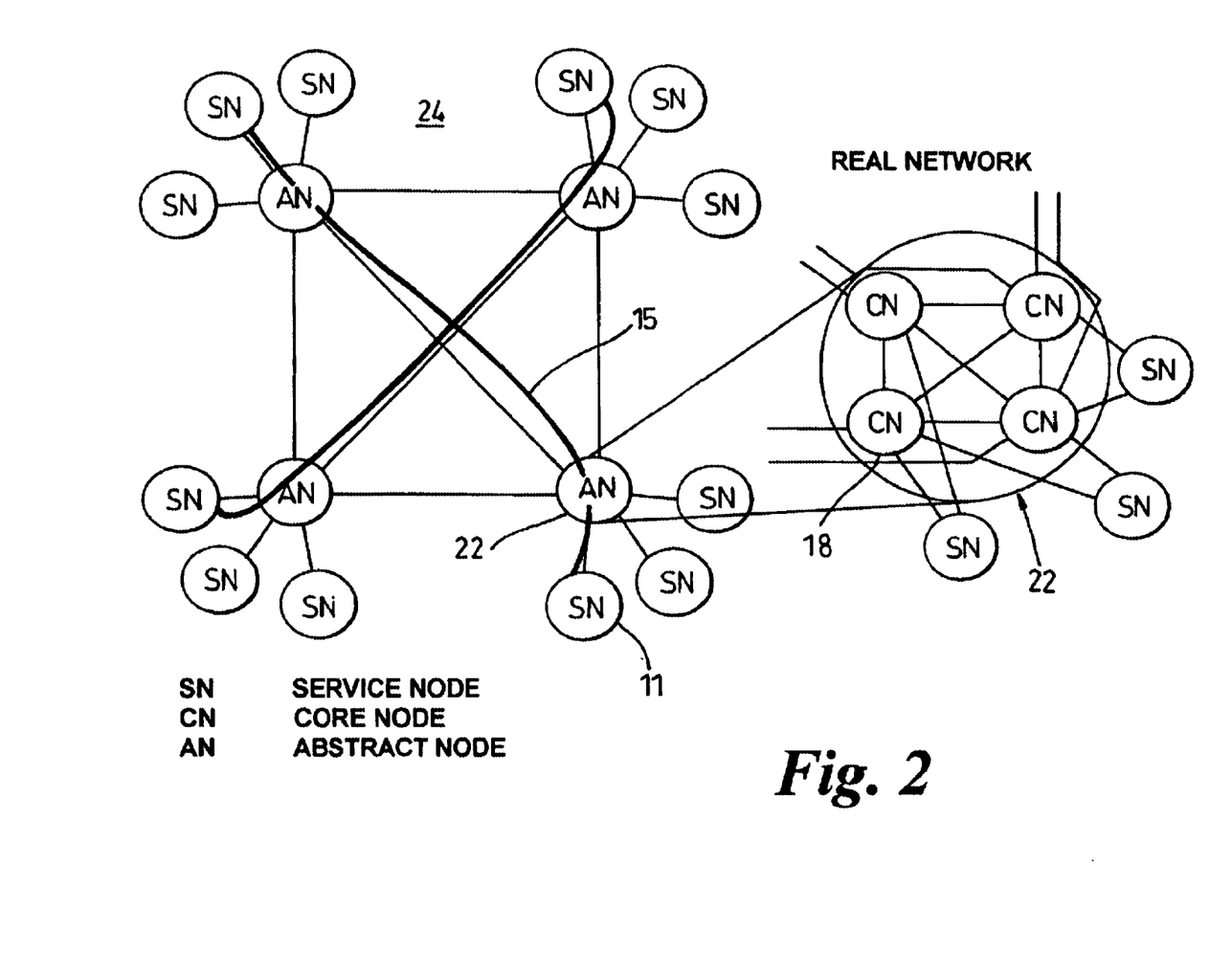
FIG. 2 shows the construction of an abstract node employed in the network of FIG. 1 and illustrates the network construction in further detail.

Referring now to FIG. 2, which is also introduced for explanatory and comparative purposes, this depicts in schematic form a portion of the network of FIG. 1. FIG. 2 is a representation of a simple network in its abstract node form, together with a possible real network realisation of one of the abstract nodes.

The network represents groups of multiple service nodes (SN) 11 each arranged around a respective abstract node (AN) 22 in each of four locations. One of the abstract nodes 22 is shown in detail to illustrate its construction from a sub-network of four core nodes (CN) 18 with multiple transport links 23 therebetween. In the network of FIGS. 1 and 2, an abstract node is defined by an IP address prefix, and all core nodes which include that prefix in their IP address are treated as part of that abstract node. It will of course be understood that an abstract node may be constructed from some other number of core nodes. Further, abstract nodes can have a temporary, semi-permanent or permanent existence depending on the network requirements.

Constraint based routed label switched paths 15 are deployed between service nodes 11 via the appropriate intervening abstract nodes 22.

In the arrangement of FIGS. 1 and 2, it is relatively simple for a management system controlling the real network to produce an abstract node version of its information model for use on a super-ordinate network manager. It is also relatively easy to produce a graphical representation of such a network and to specify traffic trunks by defining paths between service nodes and passing through abstract nodes. These graphical paths can then be used to automatically construct CR-LDP requests to establish the traffic trunks. CR-LDP can run on an existing constraint-based routed label switched path (CR-LSP) to renegotiate the traffic contract so that the technique provides for near real-time creation of VPNs as well as flexible service level agreements which can be modified e.g. on a diumal basis or on any basis which suits the customer traffic profile.

Figure 3:
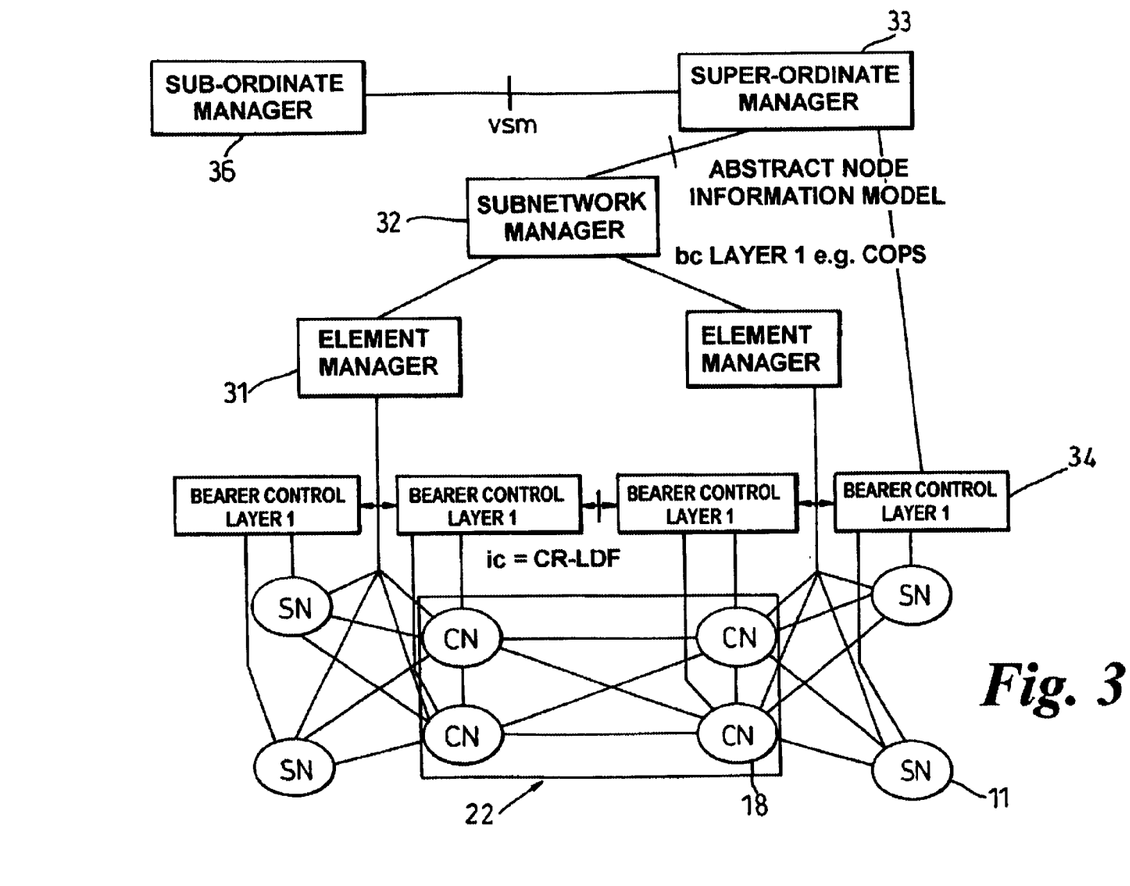
FIG. 3 shows an exemplary Layer 1 management and bearer control architecture.

A management and bearer control function for the Layer 1 physical network of FIGS. 1 and 2 is illustrated in FIG. 3. This figure shows by way of example a simple network based on a group of core nodes 18, constituting an abstract node 22, and service nodes 11. The real network has a management system based on a hierarchical structure of element managers 31 and (sub) network managers 32. The (sub) network manager 32 is responsible for constructing the abstract node information model representation of the network, which information is passed to a super-ordinate manager 33. A sub-ordinate manager 38 provides virtual switch management to perform fault, configuration, accounting, performance, and security management. The super-ordinate manager 33 is used for defining VPNs and placing traffic trunks to realise those VPNs. The super-ordinate manager also creates, modifies and deletes virtual switches. Traffic trunk requests are passed to bearer control Layer 1 (34) to initiate the CR-LDP process. This is the interface point for MPLS Layer 1 Bearer Control for which the common open policy service protocol (COPS) is preferred.

Figure 4:
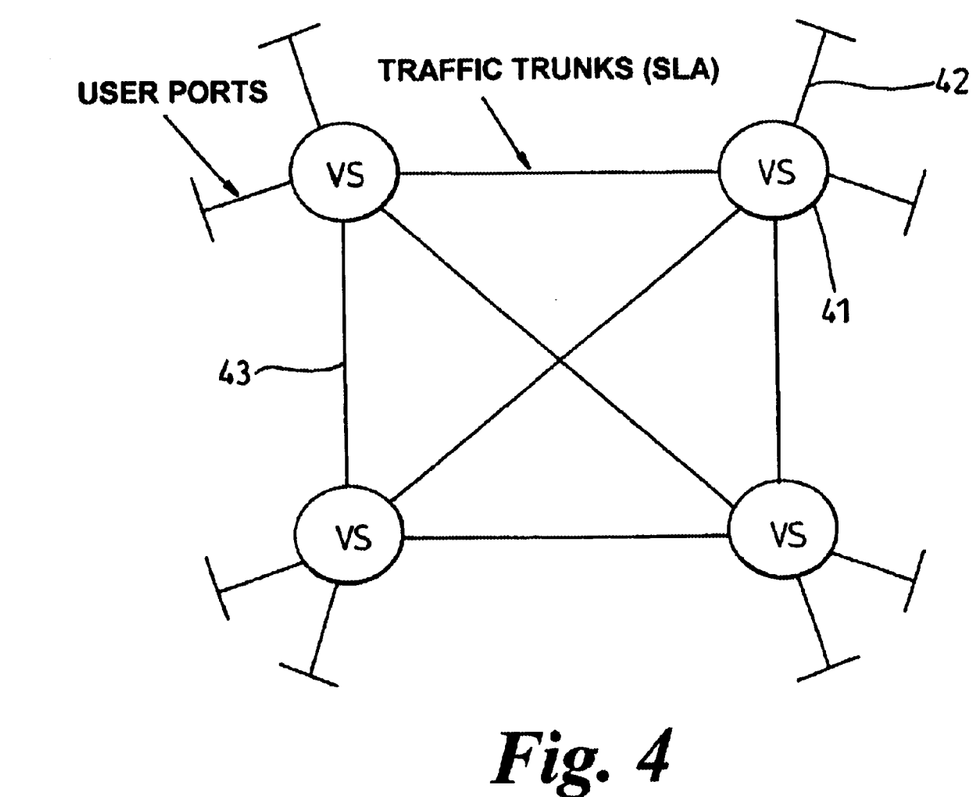
FIG. 4 illustrates a virtual public/private network information model.

The information model illustrated in FIG. 4 for the sub-network manager 32 is also simplified in that only the Layer 2 virtual switches (VS) 41 are visible. These virtual switches are configured with access ports 42 to which users are connected and traffic trunks 43 configured end-to-end and provisioned with SLAs.

Figure 5:
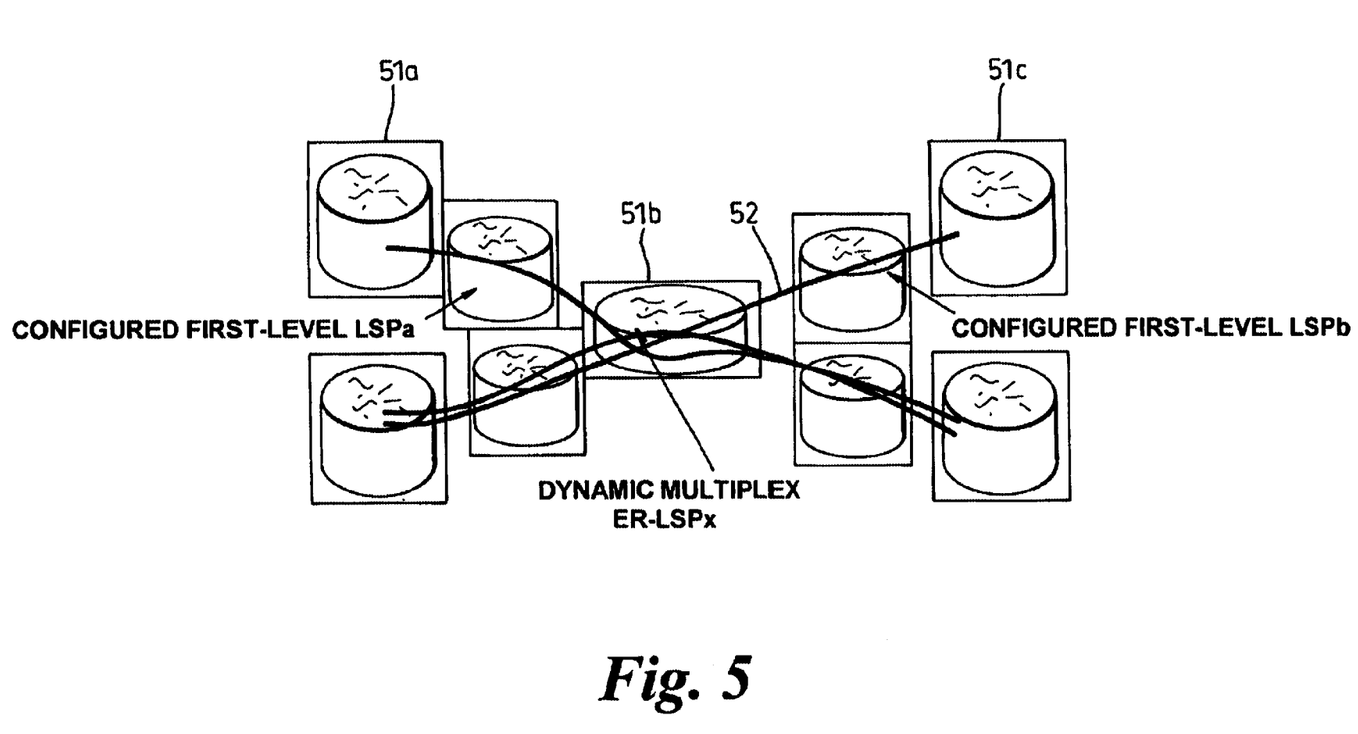
FIG. 5 illustrates the concept of a Dynamic Multiplex—Label Switched Path.

Referring now to FIG. 5 the concept of a Dynamic Multiplex Label Switch Path (DM-LSP) according to a preferred embodiment of the invention is illustrated. In the exemplary network of FIG. 5, a hierarchical three layer arrangement of local nodes 51a, regional nodes 51b and international nodes 51c is provided, each node comprising a label switched router. Within the three-stage network of MPLS label switched routers (LSR) a mesh of Layer 1 label switched paths (LSPs) 55 is established. As described above, it is possible to define the constraints for a new label switched path (LSP) in terms of existing LSPs in which case a Layer 2 LSP is established and a second level label defines the embedded CR-LSP. In the DM-LSP arrangement illustrated in FIG. 5, a third level label is defined which relates to one of a number of sessions which can be dynamically multiplexed onto the same label switched path (LSP). The DM-LSP 57 itself has no explicit traffic contract, but is instead subject to the following constraint. A new session may be multiplexed onto the DM-LSP 57 if and only if the resource constraints of the first-stage and second-stage Layer 1 constraint-based routed label switched paths (CR-LSPs) are satisfied. The checking of these constraints can be performed in the first and third stage LSRs which have full visibility of the resources committed to the first-stage and second-stage Layer 1 LSPs respectively. The second-stage (central) LSRs 51b perform an implicit switching function in that session may be dynamically routed between first and third stage LSRs using any available Layer 1 CR-LSPs, but the second stage LSRs are not involved in the control process. This simplifies the overall control architecture for the network, and minimises the real-time processing requirements on these second (central) stage LSRs enabling them to scale significantly, yet still maintains full switching flexibility. FIG. 5 also illustrates a number of LSRs which are used to route the Layer 1 CR-LSPs. These are additional network stages that may be required for the traffic management of large numbers of VPNs. They need not be directly involved in the operation of the DM-LSPs. The establishment of a DM-LSP may be implemented in CR-LDP. CR-LDP using the label request message to establish CR-LSPs. Within this message, notification that this is a DM-LSP may be signalled explicitly by defining a type length value (TLV) field that conveys this information. Alternatively, an existing traffic TLV may be used by setting the traffic contract parameters (Peak Data Rate etc.) to null values. On receipt of these null values, the receiver nodes are able to infer that, as no traffic contract is defined yet although the new CR-LSP is to be established within first-layer CR-LSPs with traffic contracts, then this request must be for a DM-LSP. Those skilled in the art will recognise that similar mechanisms may also be defined for RSVP-TE.

The ingress point to the DM-LSP (the first stage LSR 51a) has no inherent visibility of the available resource within the second-stage Layer 1 LSP, and thus requests to establish new sessions upon the DM-LSP may be denied due to insufficient resource within the second stage (egress) Layer 1 ER-LSP. The probability of denial may be significantly reduced if the third-stage (egress) LSR periodically advertises the available resources (within the second stage Layer 1 LSR) to the first stage LSRs. This resource information enables the first stage LSRs to select DM-LSPs with a higher probability of success. Alternately, the probability of denial may be eliminated substantially entirely by employing a mechanism whereby the second-stage Layer 1 CR-LSP bandwidth is pre-allocated to DM-LSPs according to current (and predicted future) needs. To implement this latter mechanism, the first stage LSR sends signalled requests to the relevant third-stage LSR asking for an additional allocation of bandwidth to a particular DM-LSP. This request will be granted provided bandwidth is available and the request meets the policy constraints set by the network. An equivalent process is used to relinquish capacity when that capacity is no longer required. A simple bandwidth management function implemented within the third stage (egress) LSR can be used to perform either of these two mechanisms.

Figure 6:
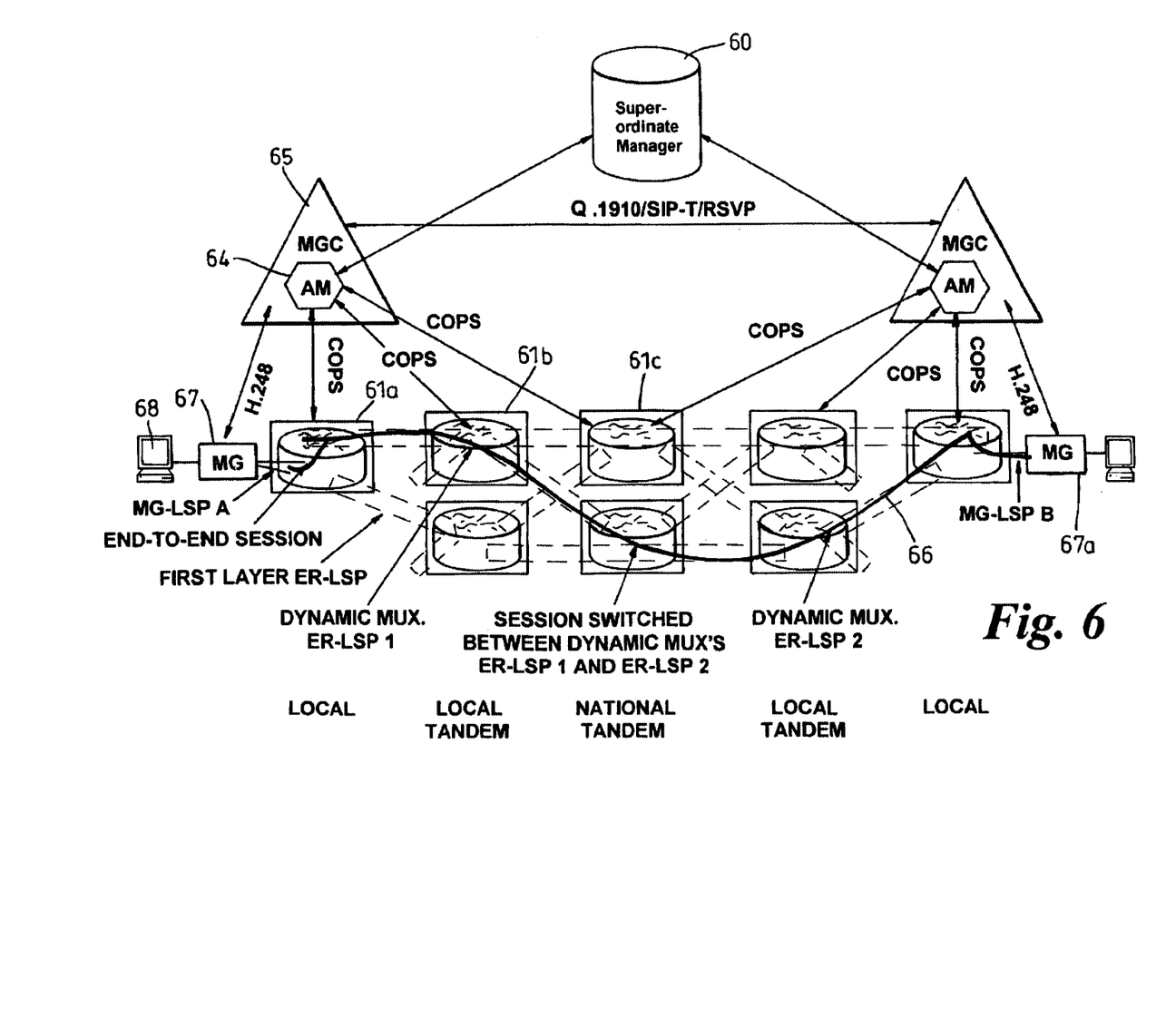
FIG. 6 illustrates a virtual public/private network controlled by a three-label stack according to a preferred embodiment of the invention.

An exemplary five-stage virtual private/public network (VPN) with three-layer label control is illustrated in FIG. 6. The network comprises a hierarchical or layered structure of local routers 61a, local tandem routers 61b and national tandem routers 61c. A super-ordinate manager 60 is responsible for configuring one or more virtual private/public networks (VPN) within the network structure of FIG. 6. This VPN configuration is performed by defining the Layer 1 label switched paths (LSPs) in terms of service level agreements and constraints for their routing through the network. This information is formulated as a COPS command which is pushed down to the label switched router (LSR) which forms the ingress of the requested CR-LSP. The super-ordinate manager 60 pushes the COPS commands to an admission manager (AM) 64 disposed in media gateway controller 65, which admission manager records resources available for use in service requests. The admission manager 64 then pushes the COPS messages down to the LSRs where these messages are used to invoke RSVP-TE or CR-LDP sessions in order to establish the virtual private/public network (VPN). The super-ordinate manager 60 then establishes a mesh of DM-LSPs (dynamic multiplex label switched paths) between all of the local label switched routers (LSRs) and all of the National Tandem LSRs. In addition to the admission manager function, simplified resource managers uniquely associated to the third stage core LSRs (National Tandems) may be used to control the allocation of layer 1 LSP bandwidth to the DM-LSPs in the manner described above.

The above process establishes a network in which a CR-LSP between any two Local LSRs, can be specified by a pair of DM-LSPs. For a full mesh configuration, there are as many alternative routes between each pair of Local LSRs as there are national tandem LSRs deployed in the network. When a media gateway controller wishes to establish a session with QoS (quality of service) guarantees it requests its associated admission manager. A session request may be initiated directly by a session control protocol such as Q1901 or SIP, or the request may be initiated as a result of intercepting an RSVP message. Communication between the media gateway controllers (MGC) uses a protocol which is able to tunnel connection control information such as Q1901, SIP or RSVP. The connection control information which is tunnelled between media gateway controllers comprises a list of LSP-IDs. In the forward direction, this list contains a set of candidate DM-LSPs which are suitable to provide access from the first-stage to third-stage LSRs (Local to National Tandem). A candidate DM-LSP is defined as a CR-LSP which the originating AM believes may have available resource to accommodate the session request.

In the reverse direction, the LSP-ID list comprises a list of the two DM-LSPs that the far-end admission manager has chosen for the session request. This list comprises one of the candidate DM-LSPs offered by the originating admission manager plus a DM-LSP that will provide the connection from the third to fifth stage LSR (National Tandem to Local). The scheme may be operated separately for each direction of transport or bi-directional operation may be chosen. The five-stage network is sufficient for long distance or global traffic. Fewer stages would be required for local services.

Once a DM-LSP (dynamic multiplex label switched path) pair-set has been negotiated, the end-to-end connection is established by the originating media gateway controller. This gateway controller uses e.g. H.248 to communicate with the originating media gateway and defines both the ingress logical port that connects the terminal to the media gateway together with a bearer package characterising a path across the network. This bearer package contains the first stage LSR IP address, the LSP-ID for the DM-LSP that connects the first to third stage LSRs, the LSP-ID for the DM-LSP that connects the third to fifth stage LSRs and the IP address of the terminating media gateway. This last address will either have been signalled as part of the normal inter-MGC call control signalling, or it could be tunnelled as part of the path negotiation process just described. The originating media gateway uses the bearer package to initiate an end-to-end CR-LDP label request message that establishes a path from media gateway to media gateway. In parallel, the terminating media gateway controller issues an H.248 command to connect this path to the logical port that connects the media gateway to the far-end terminal thus establishing the end-to-end session. The CR-LDP label request message will explicitly cause the bandwidth capacity control functions to be executed on the first, third and fifth stage LSRs (Local, National Tandem, Local). Thus the connection will be rejected if bandwidth is not currently available. This eliminates the potential for race conditions or any inaccuracies in bandwidth control/advertisement mechanisms. The QoS of existing sessions is always preserved.

In the media gateway-initiated path reservation mechanism described above, the media gateways are explicitly informed of the LSP-IDs used in the core network. If the media gateways are not fully trusted parties, then from a security perspective it would be advantageous to hide these core LSP-IDs from them and the following alternative reservation mechanism achieves this.

In this alternative embodiment, a pool of LSPs is pre-established between the media gateways and the Local LSRs. This LSP pool is controlled by the super-ordinate manager as part of the initial VPN establishment. The admission managers are given visibility of these LSPs (through their LSP-IDs) and control over their allocation. Path-negotiation occurs as before to select a pair of DM-LSPs, but, once chosen, the end-to-end connection is reserved in the following manner. The originating MGC uses H.248 to create a connection between the terminal and the first-stage LSR via one of the pre-configured LSPs that has been selected by the admission manager and is identified by its LSP-ID. The media gateway controller then use COPS to push down the connection between the first stage LSR and the fifth stage LSR. The COPS push will thus contain the incoming LSP-ID (MG to Local) plus the LSP-IDs for the DM-LSP pair-set. The first-stage (Local) LSR uses CR-LDP to establish a path across the core-network to the fifth stage LSR. In parallel the terminating media gateway controller will have issued similar H.248 commands to the terminating media gateway and a COPS push to the fifth-stage LSR to enable the end-to-end connection to be completed. The terminating (fifth stage) LSR needs to be able to correlate the CR-LDP label request message with the COPS push message so that it is able to connect the path across the core network with the path to the terminating media gateway. This may be performed implicitly (i.e. the LSR knows that the next CR-LDP request that it receives from a given first-stage LSR correlates with the most recent COPS push message or explicitly (in that a unique matching identifier is contained in both COPS and CR-LDP message). The latter mechanism may be achieved in several ways. Our preferred method is to pre-allocate a set of third-layer LSP-IDs that are visible to the admission manager. During path negotiation the admission manager selects an unused third-layer LSP-ID and includes this ID with the candidate DM-LSP LSP-ID. Once the path is negotiated, both COPS pushes contain this LSP-ID. The first-stage LSR uses this LSP-ID to identify the third-layer LSP-ID in the Label Request Message (it is the ingress LSRs role to specify a new LSP-ID for each new CR-LSP). The fifth stage LSR can then correlate this to the relevant COPS request.

Figure 7:
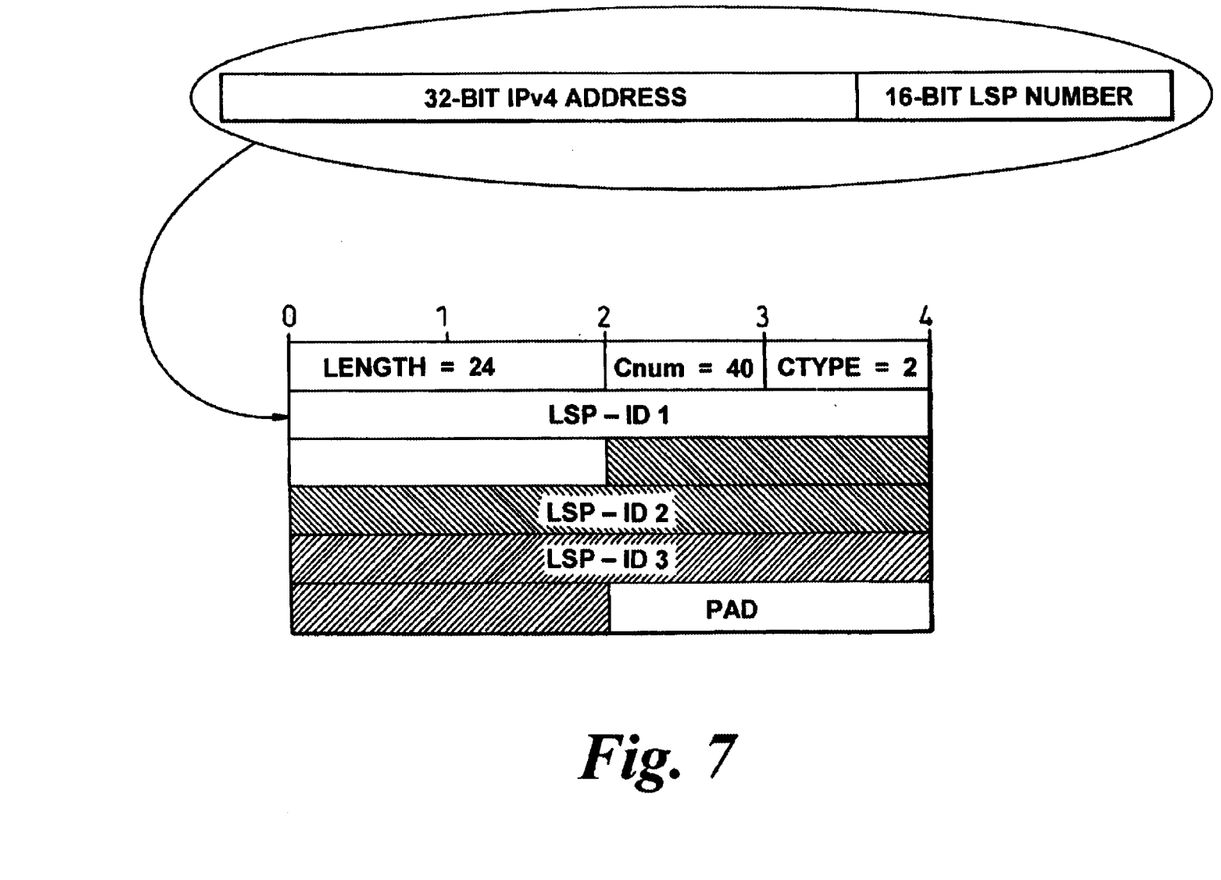
FIG. 7 illustrates the use of the COPS push mechanism to establish MPLS paths.

The process of COPS push allows the policy being applied to a particular controlled flow on an MPLS router to be asynchronously updated. That is, the MPLS router is told how to change the treatment it applies to the flow, without first asking to change it. This process is enabled by the use of ClientHandles to identify the flow.

When the path for a new flow is received at an admission manager, a COPS Decision (DEC) message is pushed, that uses the ClientHandle associated with the outermost LSP. This naturally performs the selection of the first layer ER-LSP. Contained with in this DEC is the list of paths over which the flow is to be routed. This list will include the LSP-ID of the near-end dynamic multiplex, the LSP-ID of the far-end dynamic multiplex and the LSP-ID of the connection from the far-end local switch to the destination media gateway.

To enable the transfer of this information, we have defined a new COPS Specific Object. This is shown in FIG. 7. The object conforms to the existing COPS Specific Object pattern and has a CNum of 40 and Ctype of 1. The CNum is the identifier for the object, and the CType is the instance of the object. The Object contains the list of LSP-IDs for the flow in the order in which they are to be used. Therefore LSP-ID 1 indicates the near-end dynamic multiplex and will be translated at the Local LSR into a two-tier label stack. Note that although the Clienthandle identifies the layer 1 trunk, this trunk and the dynamic multiplex share the same LSP-ID space at the local router and therefore LSP-ID 1 can easily identify the correct label stack. LSP-ID 2 will contain the LSP-ID of the second dynamic multiplex and LSP-ID 3 will contain the LSP-ID of the last hop from the far-end Local LSR to the MG.

Figure 10:
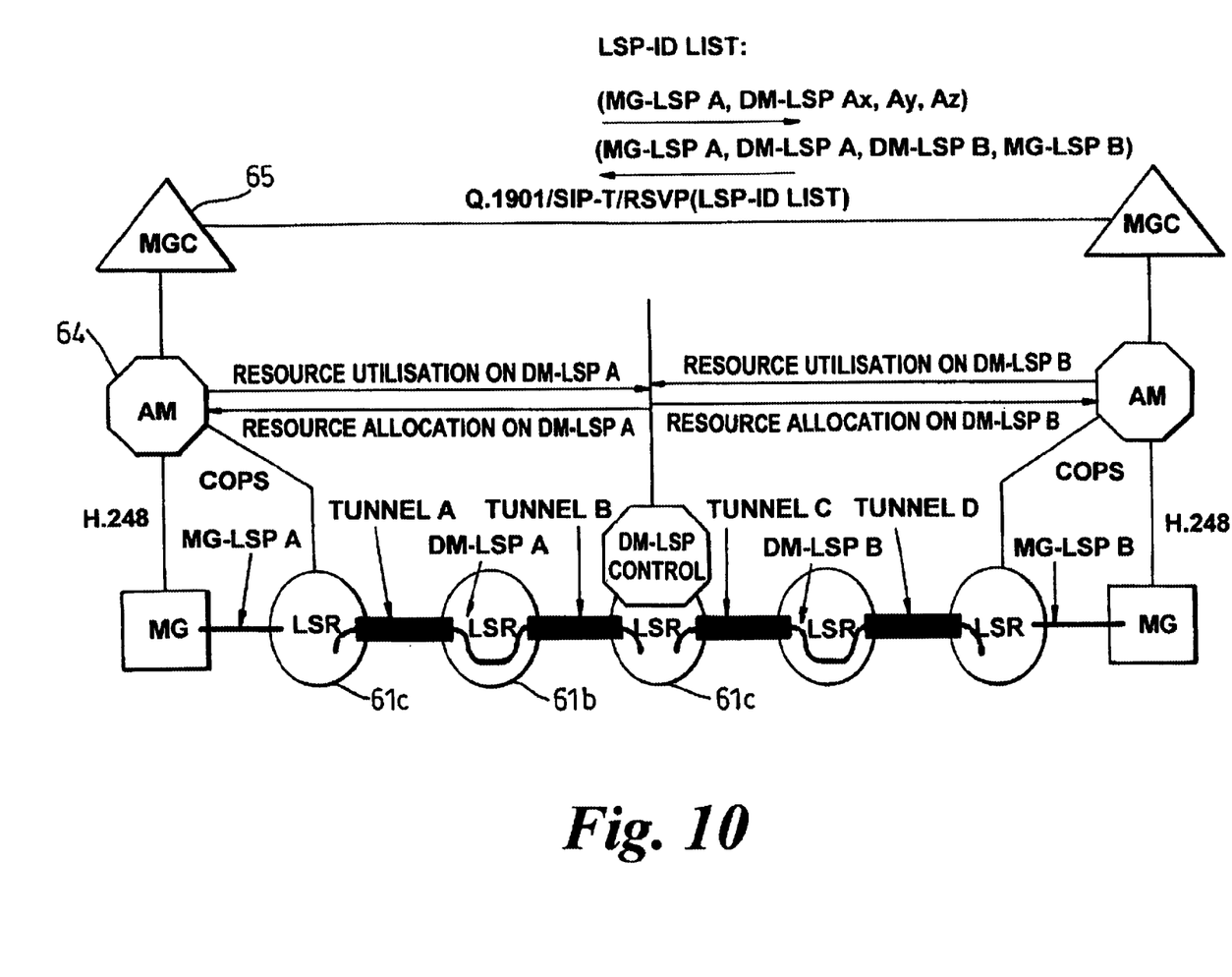
FIG. 10 illustrates the control functions of FIG. 6 to guarantee connection oriented behaviours of the end-to-end path.

These next two values are the full 48-bit LSP-IDs. In order that these two values should be copied in the same order into each packet in this flow as defined above, they must undergo suitable translation. As is illustrated in FIG. 10, each LSP-ID consists of a 32-bit IP address and a 16-bit LSP number. It is the 16 bit LSP number that is of interest so each LSP-ID must have the IP address removed and replaced with 4 leading zeros. This makes use of the fact that inserting leading zeros on a binary number leaves the value of that number the same i.e. 1101=0000 1101.

With this translation performed, the LSP-IDs are inserted in the same order as they occur in the COPS message, into the header of each packet in this flow at the Local LSR. That is, LSP-ID 3 should be the innermost of the labels. Once this is successfully completed, a Report State (RPT) message is returned indicating that the new session has been successfully installed.

Once reservation is complete the session can begin. The originating media gateway performs the function of mapping incoming (IP) packets and appending a single label to these packets prior to forwarding to the first-stage LSR. The first-stage LSR terminates the label and uses this as an index to push a 3-label stack onto the payload. The three labels comprise: a third-layer session label a second-layer DM-LSP label (for routing from first to third stage LSRs) and the first-layer label. At the second-stage LSR (Local Tandem) the first-layer CR-LSP is terminated, the second-layer label is used to identify the correct second-stage Layer 1 CR-LSP and its label pushed onto the label-stack. At the third-stage LSR (National Tandem) the second-layer DM-LSP is terminated, the third-layer label being used to index the corresponding Layer 1 and Layer 2 labels to forward the session to the next stage. The action at the fourth stage is analogous to the action at the second stage LSR. At the fifth stage LSR the layer 3 label is swapped for the corresponding label to forward the connection from the fifth stage LSR to terminating media gateway. The terminating media gateway terminates the MPLS stack and routes the packet to the terminating terminal.

Figure 8:
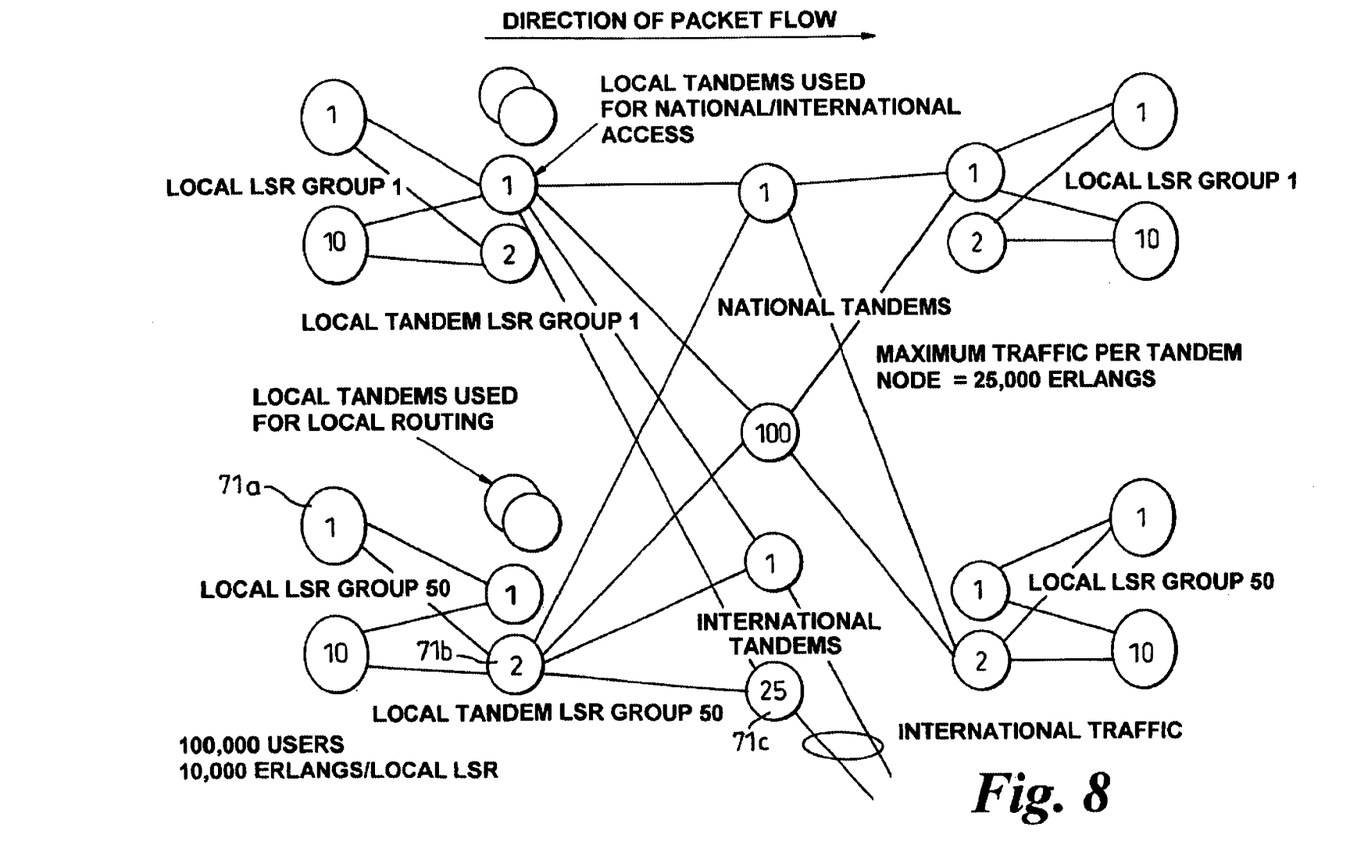
FIG. 8 illustrates the label processing functions at each node of FIG. 6

The label processing in each of the five nodes is illustrated in more detail in FIG. 8 which also shows how the optional use of penultimate hop popping can be used to improve bandwidth efficiency. Referring to FIG. 8, the Local LSR receives a packet with the label assigned to the MG-LSP A at configuration time. The payload is retrieved and three labels are pushed: Tunnel A Label/DM-LSP A Label/Session Label. Assuming penultimate hop popping, then the packet received by the local tandem node is headed by the DM-LSP A Label. As this is the penultimate node for the DM-LSP A its label is popped. The payload and remaining labels are then sent out on Tunnel B with Tunnel B label. Again with penultimate hop popping the packet received by the national tandem is headed by the session label which is used to identify DM-LSP B and the label pair Tunnel C. These two labels are pushed above the session label. At the distant local tandem the DM-LSP B Label is recognised as a penultimate hop for DM-LSP B and is popped. The payload and remaining labels are sent out on Tunnel D with Tunnel D Label. At the destination Local LSR the packet is headed by the session label which is consumed in identifying MG-LSP B and the packet is delivered to the media gateway with MG-LSP B Label which was established when MG-LSP B was configured.

By analogy with the PSTN five stages of switching appear to be necessary for QoS capable networks leading to Local/Local-Tandem/National-Tandem/Local-Tandem/Local routing for national services and Local/Local-Tandem/International-Tandem/Local-Tandem/Local routing for international services.

Figure 9:
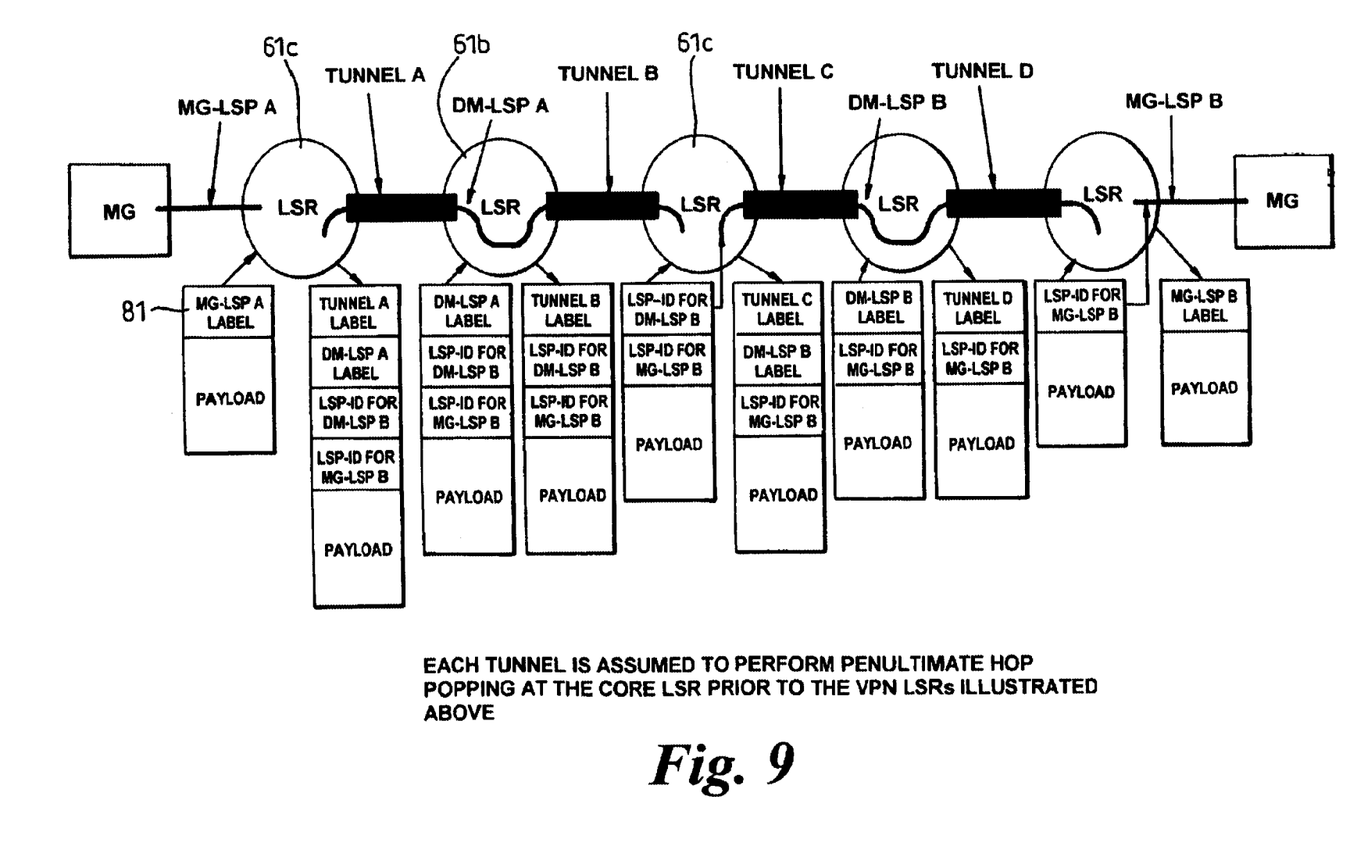
FIG. 9 illustrates an embodiment of FIG. 6 demonstrating its scalability to a large network.

By way of example of the efficacy of the techniques described above, consider a carrier having 50 million customers in the USA and a further 50 million customers in the rest of the world with 0.1 Erlang of session traffic per customer. Assume that typically 40% of traffic is long distance and 10% of traffic is international. The United States network could be organised with e.g. five hundred local nodes with typically 100,000 customers each. The Local-Tandems could be disposed in e.g. fifty groups with two switches in each group dedicated to National and International traffic. Approximately one hundred national-tandems and twenty five international-tandems would be deployed throughout the world to provide a global network. In this scheme the local nodes would typically support only 10,000 Erlangs and no tandem node would need to support more than 25,000 Erlang of session traffic. These are trivial amounts of traffic by modern standards and this readily demonstrates the flexibility and efficacy of the five-stage network described herein. The connectivity of such a network is illustrated in FIG. 9. The nodes as illustrated are Virtual Nodes, a real physical switch could support a number of such Virtual Nodes.

The overall control environment for five-stage MPLS networks is illustrated in FIG. 10. Each admission manager associated with an media gateway controller maintains a regular dialogue with the DM-LSP control functions in the national and international tandems. On a routine basis, the admission manager informs the DM-LSP Control of its current utilisation of resources on a particular DM-LSP. This allows the DM-LSP Control to evaluate the resource utilisation on the hidden tunnel (i.e. egress from Local LSR to National Tandem or Ingress from National Tandem to Local) for this DM-LSP, and to offer an explicit allocation of resources to the admission manager for the next control interval. Assuming session holding times equivalent to current PSTN practice of about 120 seconds, then control intervals of 10 or 20 seconds would be appropriate. Alternatively the previously described advertisement method could be used.

When a session request arises then the AM on the originating side is able to select an MG-LSP A and to nominate candidate DM-LSPs Ax, Ay, Az which have sufficient allocated resource for the session (optionally it also identifies the LSP-ID that will be used to establish the new layer 3 CR-LSP). The terminating side admission manager is now able to define the LSP-ID tuple for the connection by inspecting candidate DM-LSPs Bx, By, Bz. After selection, the admission manger offers MG-LSP A/DM-LSP A/DM-LSP B/MG-LSP B. This is then used by the admission manager to push the end-to-end connection. If the DM-LSP Control function is cautious in allocating resources to admission managers, then the whole process is deterministic and the Layer 1 Tunnels need never be overloaded. The explicit path reservation mechanism deployed ensures that this is always the case.

It will be understood that the above description of a preferred embodiment is given by way of example only and that various modifications may be made by those skilled in the art without departing from the spirit and scope of the invention.

We claim:

1. A method of routing information packets over label switched paths in a communications multi-service network comprising a plurality of nodes interconnected via quality of service capable tunnels each having an allocated resource capacity and incorporating a frame-mode label switched (MPLS) architecture, wherein end-to-end communications having a predetermined quality of service are provided by:
   establishing said tunnels as first level label switched path sections, identified by first level labels;
   defining at the network edge a label stack of at least a said first level label and a second level label, said label stack defining a concatenated sequence of said tunnels; and
   routing said information packets over said concatenated sequence of said tunnels using said label stack.

2. A method as claimed in claim 1, comprising:
   establishing a dynamic multiplexed label switched path, identified by said second level label, said dynamic multiplexed label switched path comprising first level label switched path sections corresponding to said concatenated sequence of said tunnels.

3. A method according to claim 2, wherein the dynamic multiplexed label switched paths have no allocated resource capacity.

4. A method as claimed in claim 2, wherein information packets for a new session are multiplexed onto said dynamic multiplexed label switched path only if the available resource capacity of said concatenated sequence of tunnels is sufficient.

5. A method as claimed in claim 1, wherein available resource capacity of tunnels corresponding to said label switched path sections is advertised periodically to the network edge, and wherein the available resource capacity is used to determine path selection.

6. A method as claimed in claim 4, wherein a session routed over a said dynamic multiplexed label switched path is identified by a third level label in said label stack.

7. A method as claimed in claim 6, wherein a bandwidth allocation mechanism is used to pre-allocate, on a predictive or as needed basis, resource capacity within tunnels corresponding to the first level label switched path sections such that path selection is deterministic.

8. A communications multi-service network comprising: a plurality of nodes interconnected via quality of service capable tunnels each having an allocated resource capacity and incorporating a frame-mode label switched (MPLS) architecture, wherein end-to-end communications having a predetermined quality of service are provided by:
   establishing said tunnels as first level label switched path sections, identified by first level labels;
   defining at the network edge a label stack of at least a said first level label and a second level label, said label stack defining a concatenated sequence of said tunnels for routing information packets.

9. A communications multi-service network as claimed in claim 8 incorporating dynamic multiplexed label switched path identified by said second level label, said dynamic multiplexed label switched path comprising first level label switched path sections corresponding to said concatenated sequence of said tunnels.

10. A communications network as claimed in claim 9, wherein said dynamic multiplexed label switched path is constrained entirely by the allocated capacity of said concatenated sequence of said tunnels.

11. A communications network as claimed in claim 9, wherein information packets for a new session are capable of being multiplexed onto said dynamic multiplexed label switched path only if the available resource capacity of said concatenated sequence of tunnels is sufficient.

12. A communications network as claimed in claim 8, wherein available resource capacity of tunnels corresponding to said label switched path sections is advertised periodically to the network edge, and wherein the available resource capacity is used to determine path selection.

13. A communications network as claimed in claim 9, wherein a session established on a said dynamic multiplexed label switched path is identified by a third level label in said label stack.

14. A communications network as claimed in claim 9, wherein a bandwidth allocation mechanism is used to pre-allocate, on a predictive or as needed basis, resource capacity within tunnels corresponding to the first level label switched path sections such that path selection is deterministic.

15. A communications network according to claim 9, wherein the dynamic multiplexed label switched paths have no allocated resource capacity.

* * * * *